US012754759B2

(12) United States Patent
Brewer

(10) Patent No.: US 12,754,759 B2
(45) Date of Patent: *Oct. 6, 2026

(54) METHOD OF REGISTERING AND EXECUTING PROGRAMMABLE ATOMIC UNIT RESOURCES WITHIN A MULTI-PROCESS SYSTEM

(71) Applicant: Micron Technology, Inc., Boise, ID (US)

(72) Inventor: Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/748,957

(22) Filed: Jun. 20, 2024

(65) Prior Publication Data

US 2026/0050466 A1 Feb. 19, 2026

Related U.S. Application Data

(63) Continuation of application No. 17/074,811, filed on Oct. 20, 2020, now Pat. No. 12,020,062.

(51) Int. Cl.

| | |
|---|---|
| ***G06F 9/46*** | (2006.01) |
| ***G06F 12/0815*** | (2016.01) |
| ***G06F 12/0875*** | (2016.01) |

(52) U.S. Cl.

CPC .......... *G06F 9/467* (2013.01); *G06F 12/0815* (2013.01); *G06F 12/0875* (2013.01)

(58) Field of Classification Search

CPC ... G06F 9/467; G06F 12/0815; G06F 12/0875
See application file for complete search history.

(56) References Cited

U.S. PATENT DOCUMENTS 7,197,445 B1 3/2007 Deepak et al.
7,447,794 B1 11/2008 Miller et al.
(Continued)

FOREIGN PATENT DOCUMENTS

CN 102804153 A 11/2012
CN 103299272 A 9/2013
(Continued)

OTHER PUBLICATIONS

"Chinese Application Serial No. 202111224820.5, Office Action mailed Aug. 14, 2024", with English translation, 12 pages.
(Continued)

*Primary Examiner* — David D Davis
(74) *Attorney, Agent, or Firm* — Schwegman Lundberg & Woessner, P.A.

(57) ABSTRACT

Chiplet systems may include a memory controller that has programmable atomic units that execute programmable atomic transactions. These instructions are stored in one or more memory partitions of memory in the programmable atomic unit. Since the programmable atomic unit executes programmable atomic transactions that are customized for various processes, and since the programmable atomic unit is a physical resource shared by multiple processes, the processes need a way of both loading the programmable atomic unit memory with instructions and a method of calling those instructions. Disclosed are methods, systems, and devices for registering, calling, and virtualizing programmable atomic transactions.

20 Claims, 10 Drawing Sheets

(56) References Cited

U.S. PATENT DOCUMENTS

| | | | |
|---|---|---|---|
| 7,941,641 | B1 | 5/2011 | Jung |
| 8,122,229 | B2 | 2/2012 | Wallach et al. |
| 8,156,307 | B2 | 4/2012 | Wallach et al. |
| 8,205,066 | B2 | 6/2012 | Brewer et al. |
| 8,423,745 | B1 | 4/2013 | Brewer |
| 8,560,816 | B2 | 10/2013 | Goodman et al. |
| 8,561,037 | B2 | 10/2013 | Brewer et al. |
| 8,739,164 | B2 | 5/2014 | Chung et al. |
| 9,355,109 | B2 | 5/2016 | Archak et al. |
| 9,710,384 | B2 | 7/2017 | Wallach et al. |
| 10,007,520 | B1 | 6/2018 | Ross |
| 10,642,538 | B1 | 5/2020 | MacLaren et al. |
| 10,733,171 | B2 | 8/2020 | Park |
| 10,783,295 | B1 | 9/2020 | Dong et al. |
| 10,896,001 | B1 | 1/2021 | Volpe et al. |
| 10,990,391 | B2 | 4/2021 | Brewer |
| 10,990,392 | B2 | 4/2021 | Brewer |
| 11,403,023 | B2 | 8/2022 | Brewer |
| 11,436,187 | B2 | 9/2022 | Brewer |
| 11,586,439 | B2 | 2/2023 | Brewer |
| 11,693,690 | B2 | 7/2023 | Brewer |
| 11,740,929 | B2 | 8/2023 | Brewer |
| 11,829,323 | B2 | 11/2023 | Brewer |
| 11,989,556 | B2 | 5/2024 | Brewer |
| 12,020,062 | B2 | 6/2024 | Brewer |
| 2006/0004882 | A1 | 1/2006 | Itikarlapalli et al. |
| 2008/0040587 | A1 | 2/2008 | Burke et al. |
| 2008/0270708 | A1 | 10/2008 | Warner et al. |
| 2009/0198920 | A1 | 8/2009 | Arimilli et al. |
| 2009/0282410 | A1* | 11/2009 | Moir ....................... G06F 9/467 718/101 |
| 2010/0106934 | A1 | 4/2010 | Calder et al. |
| 2010/0205408 | A1 | 8/2010 | Chung et al. |
| 2010/0218049 | A1 | 8/2010 | Mostow |
| 2011/0246724 | A1 | 10/2011 | Marathe et al. |
| 2012/0066457 | A1 | 3/2012 | Hertzberg et al. |
| 2012/0079177 | A1 | 3/2012 | Brewer et al. |
| 2012/0159127 | A1 | 6/2012 | Spradlin |
| 2012/0198205 | A1 | 8/2012 | Eilert |
| 2012/0311544 | A1 | 12/2012 | Higgs et al. |
| 2012/0323972 | A1 | 12/2012 | Ostrovsky |
| 2013/0332711 | A1 | 12/2013 | Leidel et al. |
| 2014/0075147 | A1 | 3/2014 | Stark et al. |
| 2014/0089635 | A1 | 3/2014 | Shifer et al. |
| 2014/0136799 | A1 | 5/2014 | Fortin |
| 2014/0164677 | A1 | 6/2014 | Borchers et al. |
| 2014/0189260 | A1 | 7/2014 | Wang et al. |
| 2014/0195784 | A1 | 7/2014 | Ivanov |
| 2014/0281442 | A1 | 9/2014 | O'sullivan et al. |
| 2014/0325126 | A1 | 10/2014 | Choi et al. |
| 2014/0344236 | A1 | 11/2014 | Xiao et al. |
| 2015/0089173 | A1 | 3/2015 | Chhabra et al. |
| 2015/0095600 | A1 | 4/2015 | Bahnsen et al. |
| 2015/0106595 | A1 | 4/2015 | Khot et al. |
| 2015/0143350 | A1 | 5/2015 | Brewer |
| 2015/0178187 | A1 | 6/2015 | Sheffler et al. |
| 2015/0188816 | A1 | 7/2015 | Snyder, II et al. |
| 2015/0205733 | A1 | 7/2015 | Steinmacher-Burow |
| 2015/0206561 | A1 | 7/2015 | Brewer et al. |
| 2015/0278097 | A1 | 10/2015 | Kelm et al. |
| 2015/0293835 | A1 | 10/2015 | Park et al. |
| 2016/0055001 | A1 | 2/2016 | Levinsky et al. |
| 2016/0283237 | A1 | 9/2016 | Pardo et al. |
| 2017/0083257 | A1 | 3/2017 | Jain et al. |
| 2017/0177365 | A1 | 6/2017 | Doshi et al. |
| 2017/0185354 | A1 | 6/2017 | Doshi et al. |
| 2017/0371660 | A1 | 12/2017 | Smith et al. |
| 2018/0173625 | A1 | 6/2018 | Moudgill et al. |
| 2018/0203783 | A1 | 7/2018 | Ishizaki |
| 2018/0357065 | A1 | 12/2018 | Bhartia et al. |
| 2018/0365425 | A1 | 12/2018 | Packer Ali et al. |
| 2019/0004810 | A1* | 1/2019 | Jayasimha ............ G06F 9/3836 |
| 2019/0004851 | A1 | 1/2019 | Doshi et al. |
| 2019/0042214 | A1 | 2/2019 | Brewer |
| 2019/0065188 | A1 | 2/2019 | Shippy et al. |
| 2019/0138240 | A1 | 5/2019 | Gayen et al. |
| 2019/0171604 | A1 | 6/2019 | Brewer |
| 2019/0243700 | A1 | 8/2019 | Brewer |
| 2019/0272119 | A1 | 9/2019 | Brewer |
| 2019/0303154 | A1 | 10/2019 | Brewer |
| 2019/0303328 | A1 | 10/2019 | Balski et al. |
| 2019/0324928 | A1 | 10/2019 | Brewer |
| 2019/0340019 | A1 | 11/2019 | Brewer |
| 2019/0340020 | A1 | 11/2019 | Brewer |
| 2019/0340023 | A1 | 11/2019 | Brewer |
| 2019/0340024 | A1 | 11/2019 | Brewer |
| 2019/0340027 | A1 | 11/2019 | Brewer |
| 2019/0340035 | A1 | 11/2019 | Brewer |
| 2019/0340154 | A1 | 11/2019 | Brewer |
| 2019/0340155 | A1 | 11/2019 | Brewer |
| 2020/0026461 | A1 | 1/2020 | Tune |
| 2020/0310684 | A1 | 10/2020 | Fowler |
| 2021/0055964 | A1 | 2/2021 | Brewer |
| 2021/0064374 | A1 | 3/2021 | Brewer |
| 2021/0064435 | A1 | 3/2021 | Brewer |
| 2021/0075633 | A1 | 3/2021 | Sen et al. |
| 2021/0149600 | A1 | 5/2021 | Brewer |
| 2021/0326255 | A1 | 10/2021 | Gu et al. |
| 2022/0121381 | A1 | 4/2022 | Brewer |
| 2022/0121474 | A1 | 4/2022 | Brewer |
| 2022/0121476 | A1 | 4/2022 | Brewer |
| 2022/0121617 | A1 | 4/2022 | Brewer |
| 2023/0004524 | A1 | 1/2023 | Brewer |
| 2023/0027534 | A1 | 1/2023 | Brewer |
| 2023/0195348 | A1 | 6/2023 | Brewer |
| 2023/0205524 | A1 | 6/2023 | Brewer |
| 2023/0251894 | A1 | 8/2023 | Brewer |
| 2024/0054100 | A1 | 2/2024 | Brewer |
| 2024/0311149 | A1 | 9/2024 | Brewer |

FOREIGN PATENT DOCUMENTS

| | | | | |
|---|---|---|---|---|
| CN | 103473181 | A | 12/2013 | |
| CN | 103513960 | A | 1/2014 | |
| CN | 105359099 | A | 2/2016 | |
| CN | 105453021 | A | 3/2016 | |
| CN | 105550126 | A | 5/2016 | |
| CN | 106462395 | A | 2/2017 | |
| CN | 106471478 | A | 3/2017 | |
| CN | 108027804 | A | 5/2018 | |
| CN | 108694109 | A | 10/2018 | |
| CN | 110168500 | A | 8/2019 | |
| CN | 111656334 | A | 9/2020 | |
| CN | 111656335 | A | 9/2020 | |
| CN | 114385240 | A | 4/2022 | |
| CN | 114385241 | A | 4/2022 | |
| CN | 114388040 | A | 4/2022 | |
| CN | 114388040 | B | 7/2023 | |
| CN | 116547644 | A | 8/2023 | |
| CN | 116583831 | A | 8/2023 | |
| CN | 116601601 | A | 8/2023 | |
| EP | 0217168 | A2 | 4/1987 | |
| WO | WO-2010051167 | A1 | 5/2010 | |
| WO | WO-2010151813 | A1 * | 12/2010 | ........... G06F 16/137 |
| WO | WO-2013184380 | A2 | 12/2013 | |
| WO | WO-2019148131 | A1 | 8/2019 | |
| WO | WO-2019191740 | A1 | 10/2019 | |
| WO | WO-2019191742 | A1 | 10/2019 | |
| WO | WO-2019191744 | A1 | 10/2019 | |
| WO | WO-2019197811 | A1 | 10/2019 | |
| WO | WO-2019217287 | A1 | 11/2019 | |
| WO | WO-2019217295 | A1 | 11/2019 | |
| WO | WO-2019217324 | A1 | 11/2019 | |
| WO | WO-2019217326 | A1 | 11/2019 | |
| WO | WO-2019217329 | A1 | 11/2019 | |
| WO | WO-2019089816 | A3 | 4/2020 | |
| WO | WO-2022086789 | A1 | 4/2022 | |
| WO | WO-2022086791 | A | 4/2022 | |

(56) References Cited

FOREIGN PATENT DOCUMENTS

| | | | |
|---|---|---|---|
| WO | WO-2022115166 | A2 | 6/2022 |
| WO | WO-2022115166 | A3 | 9/2022 |

OTHER PUBLICATIONS

"Chinese Application Serial No. 202111215429.9, Voluntary Amendment filed Aug. 12, 2022", with English claims, 26 pages.
"Chinese Application Serial No. 202111222969.X, Voluntary Amendment filed Aug. 11, 2022", with English claims, 18 pages.
"Chinese Application Serial No. 202111215429.9, Decision of Rejection mailed Mar. 25, 2023", with WIPO machine English translation, 17 pages.
"Chinese Application Serial No. 202111215429.9, Office Action mailed Oct. 26, 2022", with English translation, 16 pages.
"Chinese Application Serial No. 202111222969.X, Office Action mailed Nov. 22, 2022", with English translation, 9 pages.
"International Application Serial No. PCT/US2021/053792, International Preliminary Report on Patentability mailed May 4, 2023", 6 pgs.
"International Application Serial No. PCT/US2021/053792, International Search Report mailed Jul. 28, 2022", 4 pgs.
"International Application Serial No. PCT/US2021/053792, Written Opinion mailed Jul. 28, 2022", 4 pgs.
"International Application Serial No. PCT/US2021/055038, International Preliminary Report on Patentability mailed May 4, 2023", 5 pgs.
"International Application Serial No. PCT/US2021/055038, International Search Report mailed Jan. 28, 2022", 3 pgs.
"International Application Serial No. PCT/US2021/055038, Written Opinion mailed Jan. 28, 2022", 3 pgs.
"International Application Serial No. PCT/US2021/055050, International Preliminary Report on Patentability mailed May 4, 2023", 5 pgs.
"International Application Serial No. PCT/US2021/055050, International Search Report mailed Feb. 3, 2022", 3 pgs.
"International Application Serial No. PCT/US2021/055050, Written Opinion mailed Feb. 2, 2022", 3 pgs.
Hennessy, John L, et al., "Computer Architecture—A Quantitative Approach (4th Edition)", Elsevier, <https://app.knovel.eom/hotlink/toc/id:kpCAAQAE02/computer-architecture/computer-architecture>, (2007), 107 pgs.
Wang, H, et al., "An Enhanced HyperTransport Controller with Cache Coherence Support for Multiple-CMP", 2009 IEEE International Conference on Networking, Architecture, and Storage, doi: 10.1109/NAS.2009.46, (2009), 215-218.
"Chinese Application Serial No. 202111224820.5, Decision of Rejection mailed Feb. 26, 2025", with manual English translation, 20 pages.
"Chinese Application Serial No. 202111224820.5, Office Action mailed Dec. 18, 2024", with English translation, 14 pages.
"Chinese Application Serial No. 202111224820.5, Response filed Feb. 11, 2025 to Office Action mailed Dec. 18, 2024", with English claims, 12 pages.
"Chinese Application Serial No. 202111224820.5, Response filed Dec. 12, 2024 to Office Action mailed Aug. 14, 2024", with English claims, 20 pages.
"Chinese Application Serial No. 202180081971.1, Office Action mailed Apr. 17, 2026", with English translation, 11 pages.
"Chinese Application Serial No. 202180083481.5, Office Action mailed May 6, 2026", with English translation, 30 pages.
"Chinese Application Serial No. 202180084537.9, Office Action mailed Apr. 21, 2026", with English translation, 13 pages.

* cited by examiner

METHOD OF REGISTERING AND EXECUTING PROGRAMMABLE ATOMIC UNIT RESOURCES WITHIN A MULTI-PROCESS SYSTEM

PRIORITY APPLICATION

This application is a continuation of U.S. application Ser. No. 17/074,811, filed Oct. 20, 2020, which is incorporated herein by reference in its entirety.

STATEMENT REGARDING GOVERNMENT SUPPORT

This invention was made with U.S. Government support under Agreement No. HR00111890003, awarded by DARPA. The U.S. Government has certain rights in the invention.

BACKGROUND

Chiplets are an emerging technique for integrating various processing functionalities. Generally, a chiplet system is made up of discreet modules (each a "chiplet") that are integrated on an interposer, and in many examples interconnected as desired through one or more established networks, to provide a system with the desired functionality. The interposer and included chiplets may be packaged together to facilitate interconnection with other components of a larger system. Each chiplet may include one or more individual integrated circuits, or "chips" (ICs), potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems may include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics may be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

FIG. 1, described below, offers an example of a chiplet system and the components operating therein. As explained below, such chiplet systems may include a memory controller that has programmable atomic units that execute programmable atomic transactions that comprise one or more instructions that are executed in conjunction with values stored in the memory. These instructions are stored in one or more memory partitions of memory in the programmable atomic unit. Since the programmable atomic unit executes programmable atomic transactions that are customized for various processes, and since the programmable atomic unit is a physical resource shared by multiple processes, the processes need a way of both loading the programmable atomic unit memory with instructions and a method of calling those instructions. Disclosed are methods, systems, and devices for registering, calling, and virtualizing programmable atomic transactions.

Figure 1A:
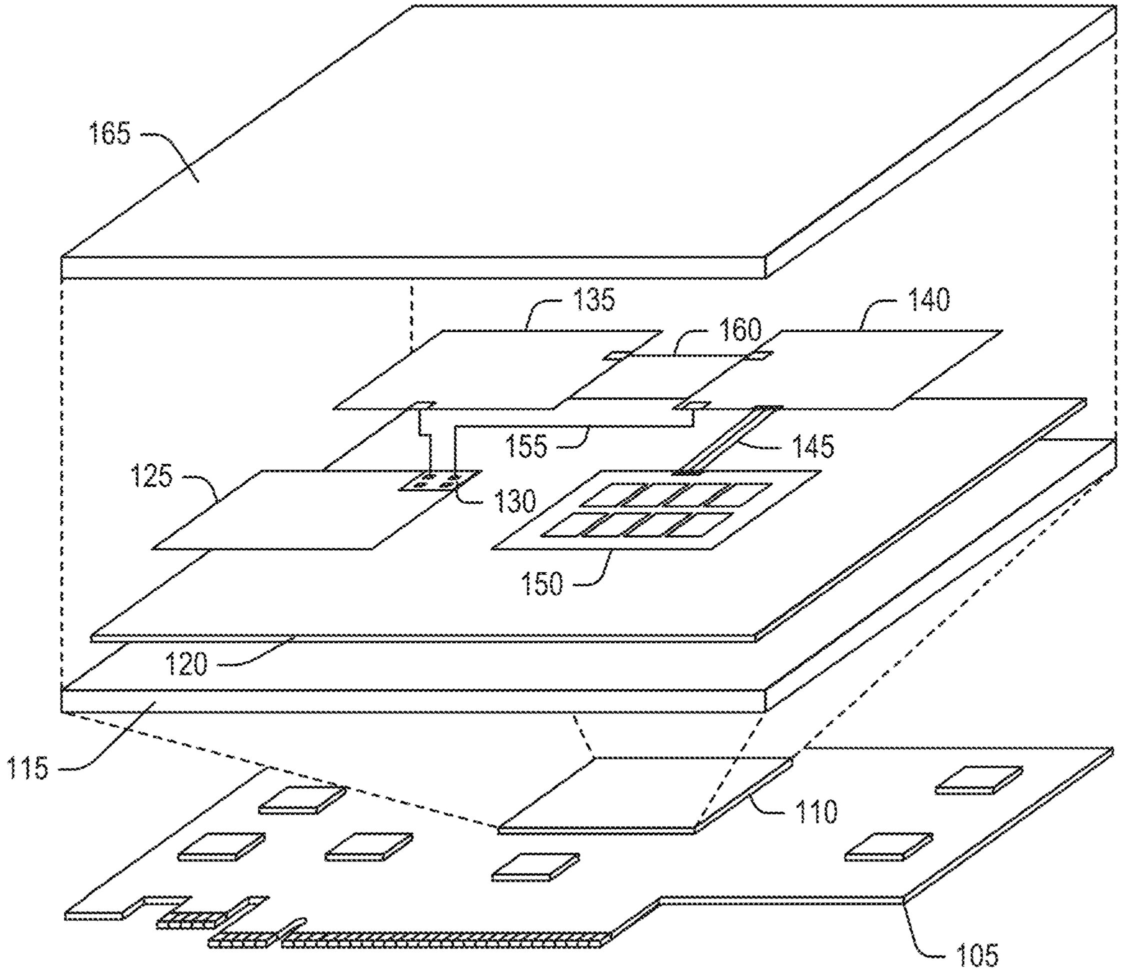
FIGS. 1A and 1B illustrate an example of a chiplet system, according to some examples of the present disclosure.
Figure 1B:
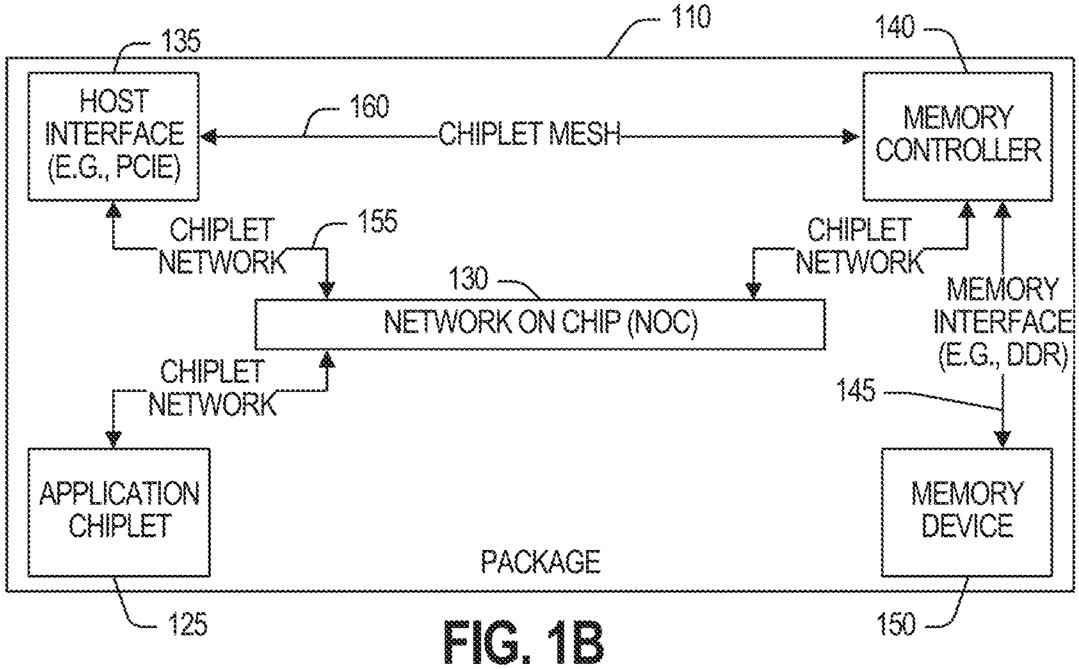

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced extensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB master or slave depending on which chiplet provides the master clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half RX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system can be through a desired interface (for example, a PCIE interface). Such as external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or of a memory controller at some times, and at other times controlled by the DRAM memory device, or by logic associated with one or more DRAM devices, such as an interface chip (in an example, a buffer).

Atomic transactions are one or more data manipulation operations that, for example, may be performed by the memory controller chiplet 140. In other chiplet systems, the atomic transactions may be performed by other chiplets. For example, an atomic transaction of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic transactions avoid transmitting the data across the chiplet mesh network 160, resulting in lower latency execution of such commands.

Atomic transactions can be classified as built-in atomics or programmable (e.g., custom) atomic transactions. Built-in atomic transactions are a finite set of operations that are immutably implemented in hardware. Programmable atomic transactions are small programs with one or more instructions (e.g., an instruction set) that may execute on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets may be provided. In an example, these memory device chiplets may each implement one or multiple storage technologies. In an example, a memory chiplet may include, multiple stacked memory die of different technologies, for example one or more SRAM devices stacked or otherwise in communication with one or more DRAM devices. Memory controller 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controllers 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
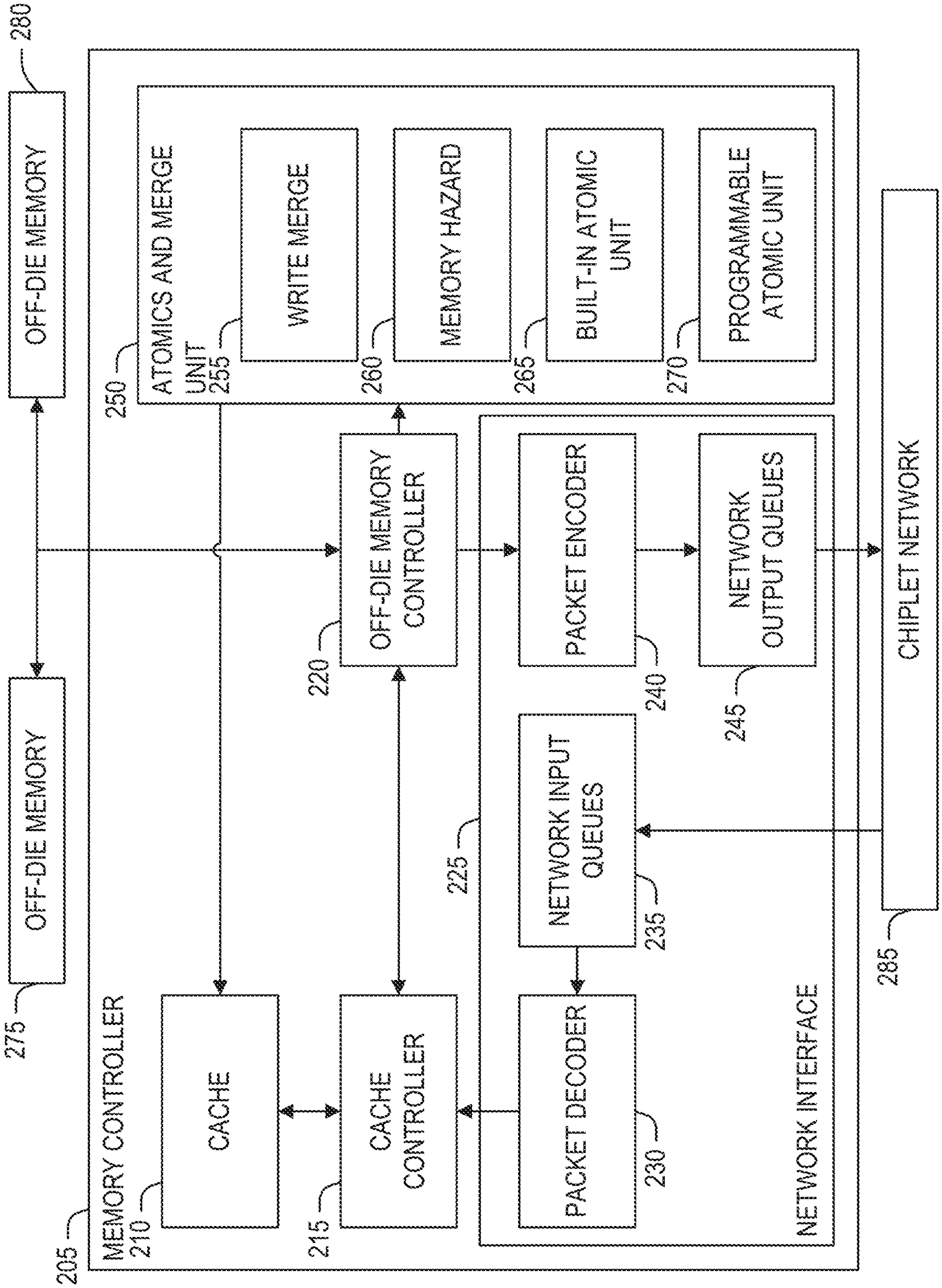
FIG. 2 illustrates components of an example of a memory controller chiplet, according to some examples of the present disclosure.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge unit 250. Members of this set can include, for example, a write merge unit 255, a memory hazard unit 260, built-in atomic unit 265 (for performing built in atomic transactions), or a programmable atomic unit (PAU) 270 (for performing programmable atomic transactions). The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples may be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge unit 250, and for input to the cache controller 215 (e.g., a memory side cache controller).

In the example configuration, cache controller 215 is directly coupled to the cache 210, and may be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge unit 250, or both. As noted above, one or more levels of cache may also be implemented in off-die memories 275 or 280; and in some such examples may be accessed directly by cache controller 215. Data read by the off-die memory controller 220 can be cached in the cache 210 by the cache controller 215 for later use.

Figure 3:
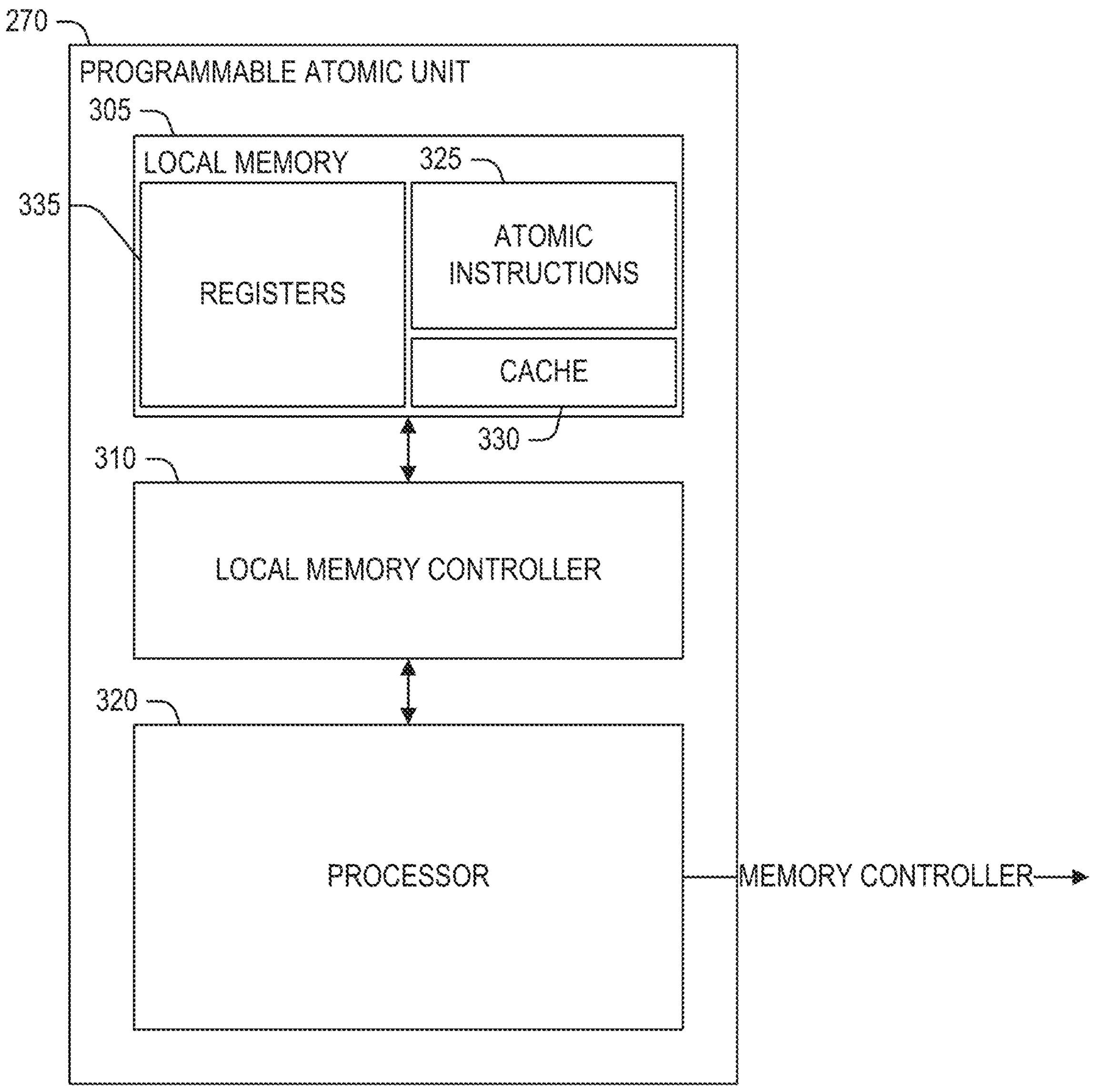
FIG. 3 illustrates components in an example of a programmable atomic unit (PAU), according to some examples of the present disclosure.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor. An example PAU 270 is shown in FIG. 3.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operation, the built-in atomic unit 265 receives the request and reads data, either from the write merge unit 255 or directly from the off-die memory controller 220. The atomic transaction is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic transactions such as fetch-and-increment or compare-and-swap. In an example, these transactions perform a simple read-modify-write operation to a single memory location of 32-bytes or less in size. Atomic memory transactions are initiated from a request packet transmitted over the chiplet network 285. The request packet has a physical address, atomic operator type, operand size, and optionally up to 32-bytes of data. The atomic transaction performs the read-modify-write to a cache memory line of the cache 210, filling the cache memory if necessary. The atomic transaction response can be a simple completion response, or a response with up to 32-bytes of data. Example atomic memory transactions include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic transactions can also involve requests for a "standard" atomic standard on the requested data, such as comparatively simple, single cycle, integer atomics-such as fetch-and-increment or compare-and-swap-which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic unit 265 to perform the requested atomic transaction. Following the atomic transaction, in addition to providing the resulting data to the packet encoder 240 to encode outgoing data packets for transmission on the chiplet network 285, the built-in atomic unit 265 provides the resulting data to the write merge unit 255, which will also write the resulting data to the cache 210. Following the writing of the resulting data to the cache 210, any corresponding hazard bit which was set will be cleared by the memory hazard unit 260.

The PAU 270 enables high performance (high throughput and low latency) for programmable atomic transactions (also referred to as "custom atomic transactions" or "custom atomic operations"), comparable to the performance of built-in atomic transactions. Rather than executing multiple memory accesses, in response to an atomic transaction request designating a programmable atomic transaction and a memory address, circuitry in the memory controller chiplet 205 transfers the atomic transaction request to PAU 270 and sets a hazard bit stored in a memory hazard register corresponding to the memory address of the memory line used in the atomic operation, to ensure that no other operation (read, write, or atomic transaction) is performed on that memory line, which hazard bit is then cleared upon completion of the atomic transaction. Additional, direct data paths provided for the PAU 270 executing the programmable atomic transactions allow for additional write operations without any limitations imposed by the bandwidth of the communication networks and without increasing any congestion of the communication networks.

The PAU 270 includes a multi-threaded processor 320, for example, such as a RISC-V ISA based multi-threaded processor, having one or more processor cores, and further having an extended instruction set for executing programmable atomic transactions. When provided with the extended instruction set for executing programmable atomic transactions, the processor 320 of PAU 270 can be embodied as one or more hybrid threading processors. In some example embodiments, the processor 320 of PAU 270 provides barrel-style, round-robin instantaneous thread switching to maintain a high instruction-per-clock rate.

PAU 270 may include a local memory 305, such as Static Random-Access Memory (SRAM), NAND, phase change memory, or the like. The local memory 305 may include registers 335, instruction memory 325, and cache 330. The local memory 305 may be accessible to the processor 320 through a memory controller 310.

Programmable atomic transactions can be performed by the PAU 270 involving requests for programmable atomic transactions on the requested data. A user can prepare programming code in the form of one or more instructions to provide such programmable atomic transactions. For example, the programmable atomic transactions can be comparatively simple, multi-cycle operations such as floating-point addition, or comparatively complex, multi-instruction operations such as a Bloom filter insert. The programmable atomic transactions can be the same as or different than the predetermined atomic transactions, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic transaction. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache controller 215.

In selected examples, the approach taken for programmable atomic transactions is to provide multiple, generic, programmable atomic transaction request types that can be sent through the chiplet network 285 to the memory controller chiplet 205 from an originating source such as a processor or other system component. The cache controllers 215 or off-die memory controller 220 identify the request as a programmable atomic transaction and forward the request to the PAU 270. In a representative embodiment, the PAU 270: (1) is a programmable processing element capable of efficiently performing a user defined atomic transaction; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined transaction. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard unit 260. Accordingly, when the request and read data is received by the write merge unit 255, a reset or clear signal can be transmitted by the memory hazard unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

FIG. 3 illustrates a block diagram of a programmable atomic unit 270 according to some examples of the present disclosure. As previously described, programmable atomic units may include one or more programmable atomic transactions that are specified by sets of one or more atomic instructions stored in instruction memory 325 that are custom defined and perform operations on memory managed by the memory controller. The instructions of atomic transactions may be specified by applications and/or processes outside the programmable atomic unit 270 that may reside on the memory controller chiplet 205, other chiplets (such as application chiplet 125), or an off chiplet-device. In some examples, the instructions of the programmable atomic transaction are loaded by the operating system when registered by a process. To execute the programmable atomic transaction, the initiating process sends a CPI message including an instruction to execute the requested programmable atomic transaction on the local memory 305 of the programmable atomic unit 270 by providing an index into the local memory of the programmable atomic unit 270. The programmable atomic transactions may utilize cache 330, registers 335, and other memory of local memory 305 during execution. Local memory controller 310 may manage the local memory 305. In some examples, programmable atomic unit 270 may not need the local memory controller as the local memory 305 may be SRAM.

As previously described, the instructions for the programmable atomic transactions are stored in one or more memory partitions of memory in the programmable atomic unit. Since the programmable atomic unit executes programmable atomic transactions that are customized for various processes, and since the programmable atomic unit is a physical resource shared by multiple processes, the processes need a way of both loading the programmable atomic unit memory with instructions and a method of calling those instructions. Disclosed are methods, systems, and devices for registering, calling, and virtualizing programmable atomic transactions.

The instruction memory of the programmable atomic unit may be partitioned into contiguous blocks called partitions. Each partition may hold a number of instructions (e.g., 32 instructions) and may be managed by the operating system. The operating system may track which partitions are free and which are used by which programmable atomic transactions. A process desiring to call a programmable atomic transaction first registers the programmable atomic transaction by calling one or more functions of an operating system through an application programming interface (API). The function call of the API may include the instructions (or a location of the instructions) to load. The operating system receives this API call and then determines a size needed to hold the instructions (e.g., by counting the number of instructions that are provided). The operating system uses the determined size to locate a series of one or more contiguous free partitions of instruction memory (e.g., instruction memory 325) in the programmable atomic unit that are large enough to hold the programmable atomic transaction's instructions. The first partition index in that instruction block corresponds to a system unique index (SCAID) that globally identifies that programmable atomic transaction. That is, the SCAID is unique across all processes in all processors as to a particular programmable atomic operation. The operating system then loads instructions to the selected memory partitions of the programmable atomic unit. The operating system or the programmable atomic unit determines and then stores the number of partitions and the instruction execution limit in a table indexed by the SCAID for later use to ensure that the programmable atomic transaction does not execute instructions beyond the loaded partitions and does not enter an infinite loop.

During registration, the operating system may also associate a process specific index (PCAID) with the SCAID—e.g., through a mapping table that maps the PCAID to an SCAID. Each active programmable atomic transaction may be assigned a process unique custom atomic identifier (PCAID). The PCAID is specific to each process. The PCAID allows multiple processes within a system to simultaneously submit programmable atomic operations to the shared programmable atomic unit resources without the individual processes knowing that other processes are accessing those resources.

After registration, the PCAID is used by the process to specify which programmable atomic transaction is to be called. PCAIDs may be hard coded at application compile time and provided by the process to the operating system during registration (e.g., as a function parameter of the API). In other examples, the operating system may assign a PCAID during registration (which may be returned as a result of the API call). Allowing the operating system to assign the PCAID (e.g., dynamic allocation) allow libraries of common programmable atomic transactions to be separately developed and linked to programs. In some examples, the system may support both means of using PCAIDs: statically and dynamically. In these examples, a convention may be established where static allocation occurs starting at PCAID 0 and working up, and dynamic allocation starting at PCAID 31 and working down. The host runtime provides the support for static versus dynamic allocation of PCAIDs.

As previously described, when requesting execution of a particular programmable atomic transaction, a requesting process may call the programmable atomic with an instruction including the PCAID. The instruction causes the processor to lookup the SCAID from the PCAID in the translation table. The processor may also check a validity bit in the table that indicates whether the instructions are loaded in the programmable atomic unit (the bit may be set during registration). If the bit does not indicate that the instructions are loaded, then an error may be returned. If the bit indicates that the instructions are loaded, then the processor forms a request packet and sends it to the programmable atomic unit of the memory controller. The request packet may include the particular memory location (e.g., partition(s) within local memory 305) identified by the SCAID, a location of the memory managed by the memory controller chiplet 205 (e.g., off-die memory 275, 280) that is to be operated upon, and one or more arguments. This message is then sent to the memory controller, upon receipt of the message, the processor (e.g., processor 320) of the programmable atomic unit then begins executing the instructions at the indicated partition. That is, the first instruction at the indicated partition is executed.

Figure 4:
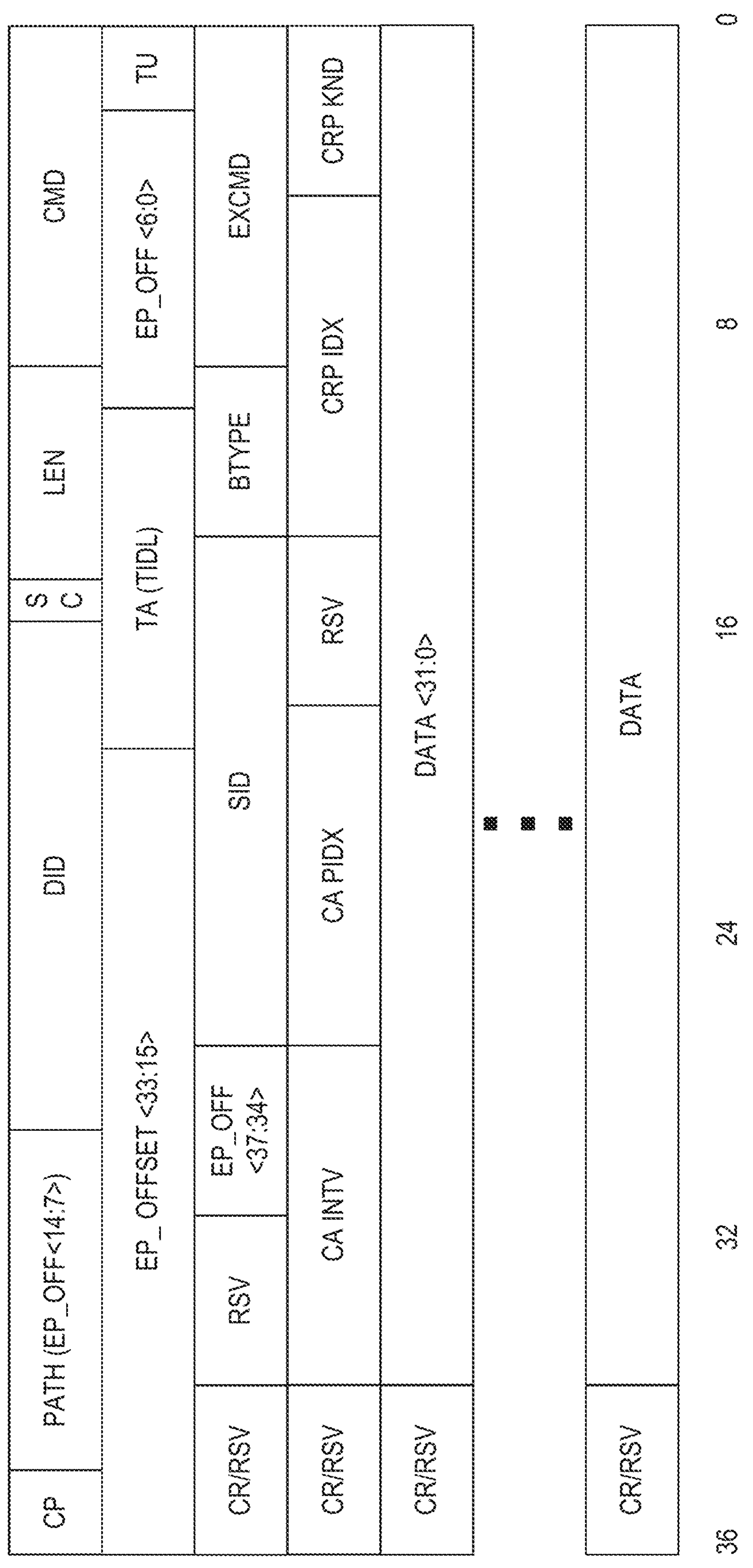
FIG. 4 illustrates a request packet for requesting execution of a particular programmable atomic transaction according to some examples of the present disclosure.

FIG. 4 illustrates a request packet for requesting execution of a particular programmable atomic transaction. The fields are described as:

| Field Name | Field Width | Value | Description |
|---|---|---|---|
| CMD | 8 | 126 | Extended VC1 |
| LEN | 5 | | Packet Length |
| SC | 1 | 0 | Sequence Continue (ignored for EMD) |
| DID | 12 | | Destination NOC endpoint |
| PATH | 8 | | Endpoint Offset <14:7> |
| CP | 2 | 1 | Credit/Path Order-Credit Return enabled in flits 3-N and Path field based path ordering |
| TU | 2 | | Transaction ID <9:8> |
| EpOFF<6:0> | 7 | | Endpoint Offset <6:0> |
| TA | 8 | | Transaction ID <7:0> |
| EPOffset<33:15> | 19 | | Endpoint Offset <33:15> |
| EXCMD | 8 | | Extended Command |
| BTYPE | 4 | 8 | BTYPE of 8 is EMD vendor defined |

-continued

| Field Name | Field Width | Value | Description |
|---|---|---|---|
| SID | 12 | | Source NOC endpoint |
| EPOFFSET <37:34> | 4 | | Endpoint Offset <37:34> |
| RSV | 4 | 0 | Reserved |
| CR/RSV | 4 | | Credit Return |
| CrPKnd | 4 | | Credit pool kind |
| CrPIdx | 8 | | Credit Pool Index |
| RSV | 4 | 0 | Reserved |
| CaPIdx | 8 | | Custom Atomic Partition Index |
| CaIntv | 8 | | Interleave Size |
| CR/RSV | 4 | | Credit Return |
| DATA | 32 | | Argument Data: 0, 1, 2, or 4 64 Bit Values |
| CR/RSV | 4 | | Credit Return |

As noted, a programmable atomic transaction begins by executing the first instruction located at the partition in the instruction RAM (e.g., local memory 305 of programmable atomic unit 270) of the programmable atomic transaction specified by the Custom Atomic Partition Index (CaPldx) (the SCAID). The operation starts at the first instruction within the partition. The CaPldx may also be used to index into a control structure that contains additional information for the operation. The additional information includes a flag to indicate whether the transaction is valid, the number of partitions for the transaction and the instruction execution limit. The additional information may be set by the operating system or the programmable atomic unit when the programmable atomic transaction is registered. The number of partitions is used to validate that an operation is executing within the appropriate partitions. An exception is detected, and the executing operation is terminated if execution in an inappropriate partition or if the number of instructions executed exceeds the instruction execution limit is detection.

Figure 5:
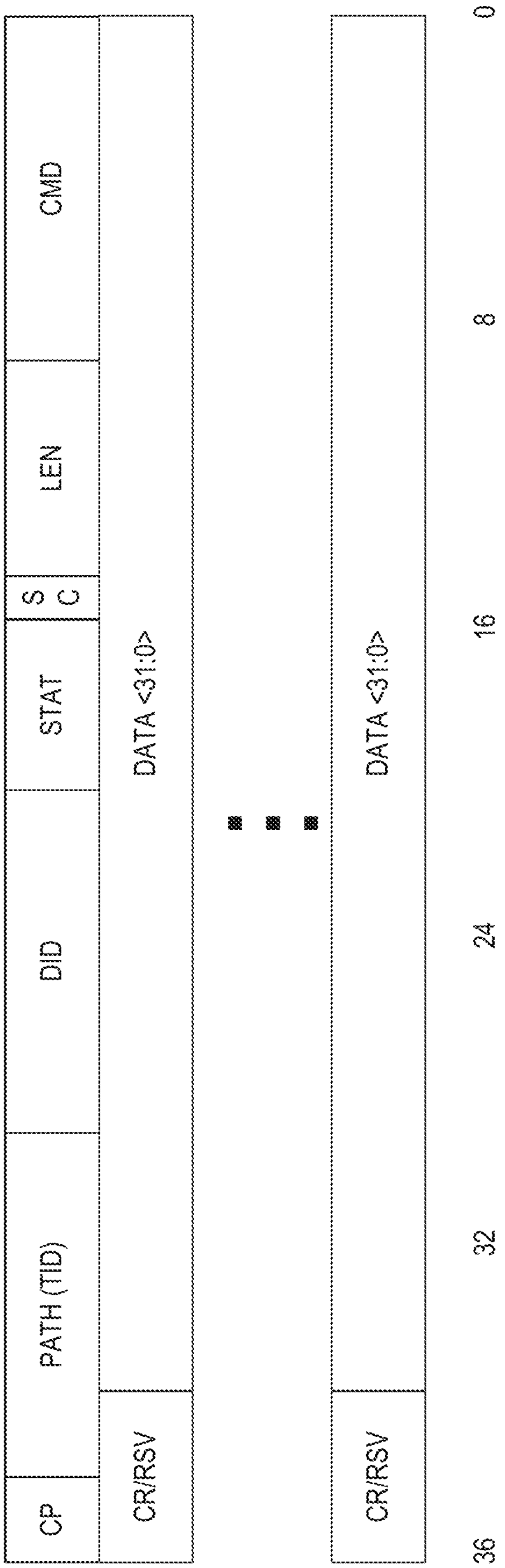
FIG. 5 illustrates a programmable atomic transaction response message according to some examples of the present disclosure.

A response to the programmable atomic transaction is provided as a memory response. For example, FIG. 5 illustrates the response message. The fields of the response message are as follows:

| Field Name | Field Width | Description |
|---|---|---|
| CMD | 8 | Packet command |
| LEN | 5 | Encoded Packet Length |
| SC | 1 | Sequence Continue. When set, this packet is part of a multi-packet transfer and this packet is not the last packet in the sequence. This bit is present in the first flit of all packet types |
| DID | 8 | Destination Endpoint ID bits 7:0-destination fabric endpoint |
| STAT | 4 | Response Status |
| Path | 8 | The Path field is used to specify a path through a CPI fabric to force ordering between packets. For both CPI native and AXI over CPI the read response packet's PATH field contains the TID value |
| CP | 2 | Credit Present/Path Ordering. The CP field contains an encoded value that specifies both if field CR of flits 3-N of the packet contains credit return information as well as whether path ordering is enabled. |
| Data | 32 | Read response data-bits N*8-1:0 |
| CR/RSV | 4 | Credit Return Information |
| RSV | 4 | Reserved |

Figure 6:
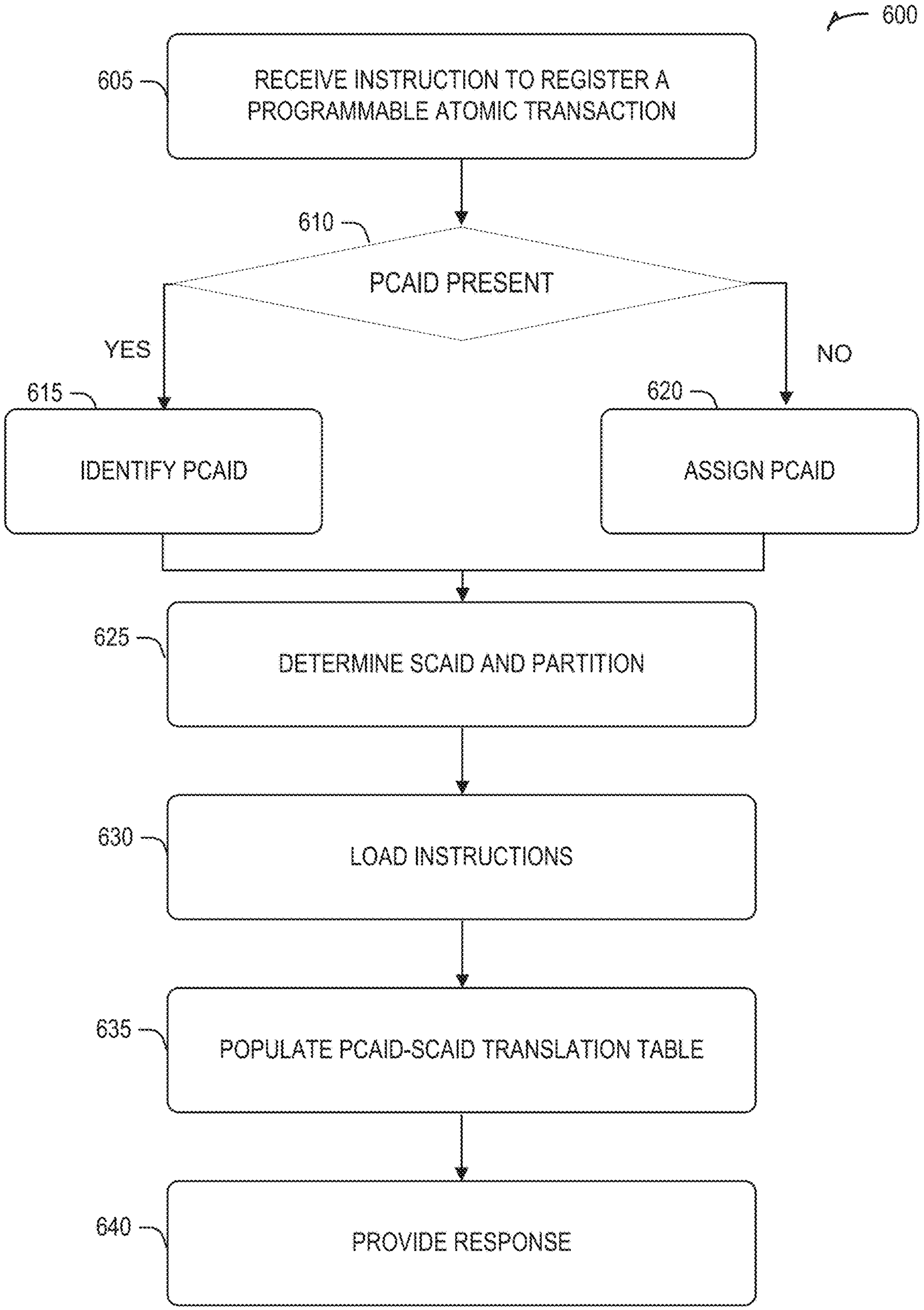
FIG. 6 illustrates a flowchart of a method of registering a programmable atomic transaction according to some examples of the present disclosure.

As noted, an API provided by an operating system may be used by a process to register a programmable atomic transaction. FIG. 6 illustrates a flowchart of a method of registering a programmable atomic transaction according to some examples of the present disclosure. At operation 605 an instruction may be received from a process by an operating system to register a programmable atomic transaction. The instruction may include a set of instructions for the transaction (or a pointer to a memory location—such as a memory location managed by the memory controller—with a set of instructions) and optionally a PCAID. At operation 610 the operating system may determine if a PCAID is present in the registration request. If the PCAID is present, then at operation 615 the PCAID is identified from the request message. In some examples, a check is made to ensure that the PCAID has not already been used and is a valid value. If the PCAID is already in use or is an invalid value, then a failure response may be sent to the process. If at operation 610, the PCAID is not present in the instruction or if the instruction includes a flag indicating that a PCAID should be assigned, then at operation 620 a PCAID is assigned from a plurality of valid values. For example, an unused PCAID that is a valid value may be found and assigned. If no unused PCAIDs remain, then an error may be returned. In some examples, the PCAID may be assigned based upon an assignment scheme. For example, by selecting an unused number in a pool of numbers.

At operation 625 the operating system may find one or more contiguous partitions in the instruction memory of the programmable atomic unit. For example, the operating system may count the number of instructions in the programmable atomic transaction. The number of instructions may be divided by the number of instructions that may be stored in each partition of the instruction memory of the programmable atomic unit. Rounding this number up to the next partition gives the number of partitions n that are needed to store the programmable atomic transaction. The operating system may utilize a table to track the partitions that are currently in use and may use the first contiguous block of n partitions, or else use different selection logic to find n contiguous partitions. The index of the first partition is the SCAID.

At operation 630, the operating system may load the instructions into the instruction memory. For example, by using a CPI request packet that includes the instructions, or includes a memory location in a memory managed by the memory controller that contains the instructions. The request may include the partition index (SCAID) where the first instruction is to be stored, the number of partitions to use, and a maximum number of instructions to execute field which sets an upper bound on the number of instructions that can be executed with this programmable atomic transaction. The maximum number of instructions to execute field is a check to prevent infinite loops in the programmable atomic transactions and may be set based upon the number of instructions in the programmable atomic transaction calculated by the operating system during registration. For example, the maximum number of instructions may be the number of instructions in the programmable atomic transaction, or may be higher to account for potential retries of instructions (e.g., instructions that may be retried due to resource conflicts).

At operation 635 the operating system may populate the PCAID-SCAID table with the determined PCAID from operation 615 or 620. The table may be a table in a register of the processor, or in working memory. The table may be indexed by either the PCAID or the SCAID and may provide the corresponding identifier (e.g., if the PCAID is provided, the SCAID may be returned and vice versa). In other examples, the table may have other data, such as an indicator as to whether the PCAID/SCAID is valid and loaded with instructions. The indicator may be checked when a programmable atomic transaction is called. At operation 640, a response may be provided. If the registration succeeds, a status code may be returned, and if assigned by the operating system, the PCAID. The process may store the PCAID and may later call the programmable atomic transaction using the PCAID.

Figure 7:
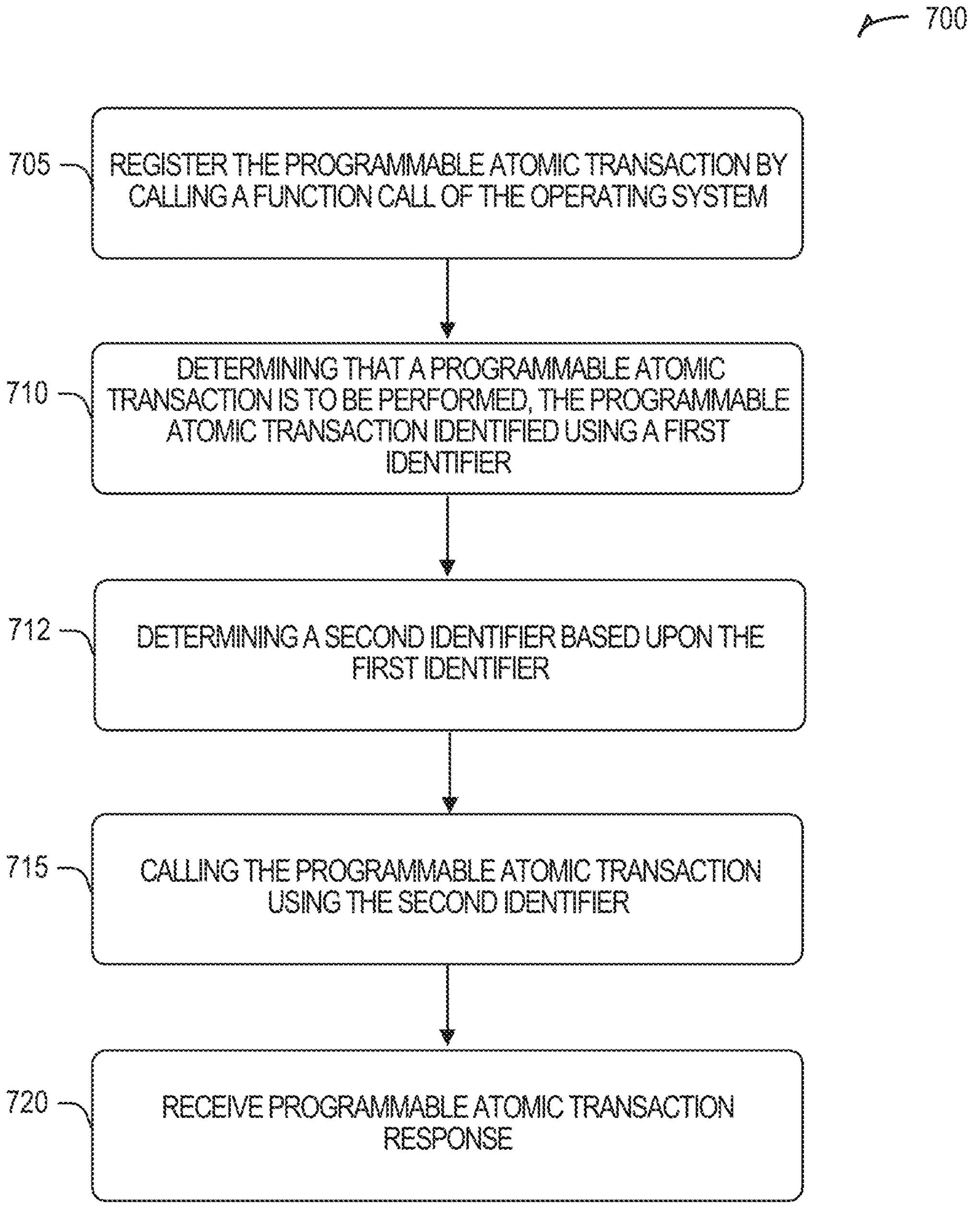
FIG. 7 illustrates a flowchart of a method of registering and calling a programmable atomic transaction according to some examples of the present disclosure.

FIG. 7 illustrates a flowchart of a method 700 of registering and calling a programmable atomic transaction according to some examples of the present disclosure. At operation 705, a process may register the programmable atomic by utilizing an API provided by the operating system. For example, through a function call. The process may assign a PCAID or may have the operating system assign the PCAID. If the process chooses to have the operating system assign the PCAID, the response may include the assigned PCAID.

At operation 710 the system may determine that a programmable atomic transaction is to be performed. For example, as part of instructions of a process, an instruction may be executed to call a programmable atomic transaction. The programmable atomic transaction is identified by the process by a first identifier (PCAID). The first identifier uniquely identifies the programmable atomic transaction within a first process executing on a hardware processor of the multi-process system, a same first identifier in a second process may refer to a different programmable atomic transaction.

At operation 712, using the first identifier, the processor may determine a second identifier (SCAID) based upon the first identifier. For example, the first identifier may be a PCAID and the second identifier may be the SCAID. The processor may use the translation table to translate the first identifier to the second identifier. The translation table may be specific to a certain process and in these examples, a process identifier may be used along with the PCAID to lookup the correct SCAID.

At operation 715, the programmable atomic transaction is called using the second identifier (SCAID). For example, by sending a CPI message to initiate the transaction with a second identifier that is determined by the translation table. The CPI message may be created and sent as a result of an instruction called by the process. That is, the processor executing the process (which may be a same processor or different processor that executes the programmable atomic transaction) may have a defined instruction that takes all the information needed to call the programmable atomic transaction, translate the PCAID to an SCAID, form a packet, and send the request. At operation 720 the process receives the response from the programmable atomic operation. The response may be an exception, a success response, a fail response, or the like.

Figure 8:
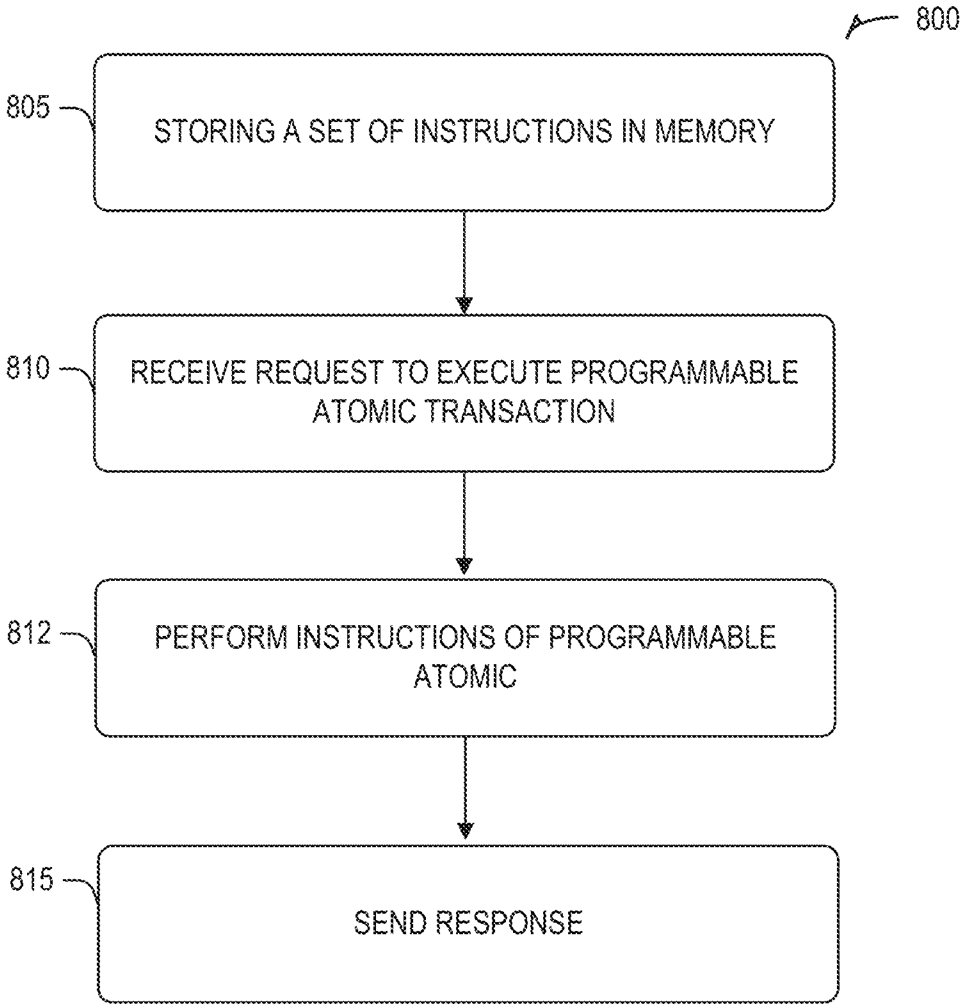
FIG. 8 illustrates a flowchart of a method of a programmable atomic unit handling a request to execute a programmable atomic transaction according to some examples of the present disclosure.

FIG. 8 illustrates a flowchart of a method 800 of a programmable atomic unit handling a request to execute a programmable atomic transaction according to some examples of the present disclosure. At operation 805, the programmable atomic unit stores a set of instructions in the memory of the programmable atomic unit. For example, a request message may be sent to store a particular set of instructions at one or more particular partitions. For example, an operating system may track and manage which partitions are assigned to which programmable atomic units and may specifically allocate partitions to processes when requested. At this point, the control structure may be initialized which specifies that the request is valid and stores the number of instructions and the number of partitions.

At operation 810, the programmable atomic unit may receive an instruction to execute a programmable atomic transaction. As previously described the instruction may specify one of a plurality of programmable atomic instruction sets that are stored within the memory of the programmable atomic unit that define operations performed for a particular programmable atomic transaction. The instruction may specify the particular programmable atomic transaction based upon a memory partition identifier as previously described.

At operation 812, the programmable atomic unit may perform the instructions of the programmable atomic transaction. Such instructions may include reading values from memory (e.g., off-die memory 275, 280) controlled by the memory controller of which the programmable atomic unit 270 is a part of. Such instructions may perform operations to the value read from the memory, and may store modified values back to the memory (e.g., off-die memory 275, 280). Such operations provide reduced latency to processes that call the PAU. At operation 815, a response may be sent to the calling processor when either a termination instruction is reached or an exception is determined. In the example of an exception, the response may indicate whether the programmable atomic terminated normally or whether it terminated with an exception. For example, a response message such as shown in FIG. 5. Exceptions may include the number of instructions exceeding the instruction execution limit (e.g., the instructions of the transaction did not include a termination instruction), the instruction executing outside a legal partition (e.g., as defined by the CAPIdx and the number of partitions).

Figure 9:
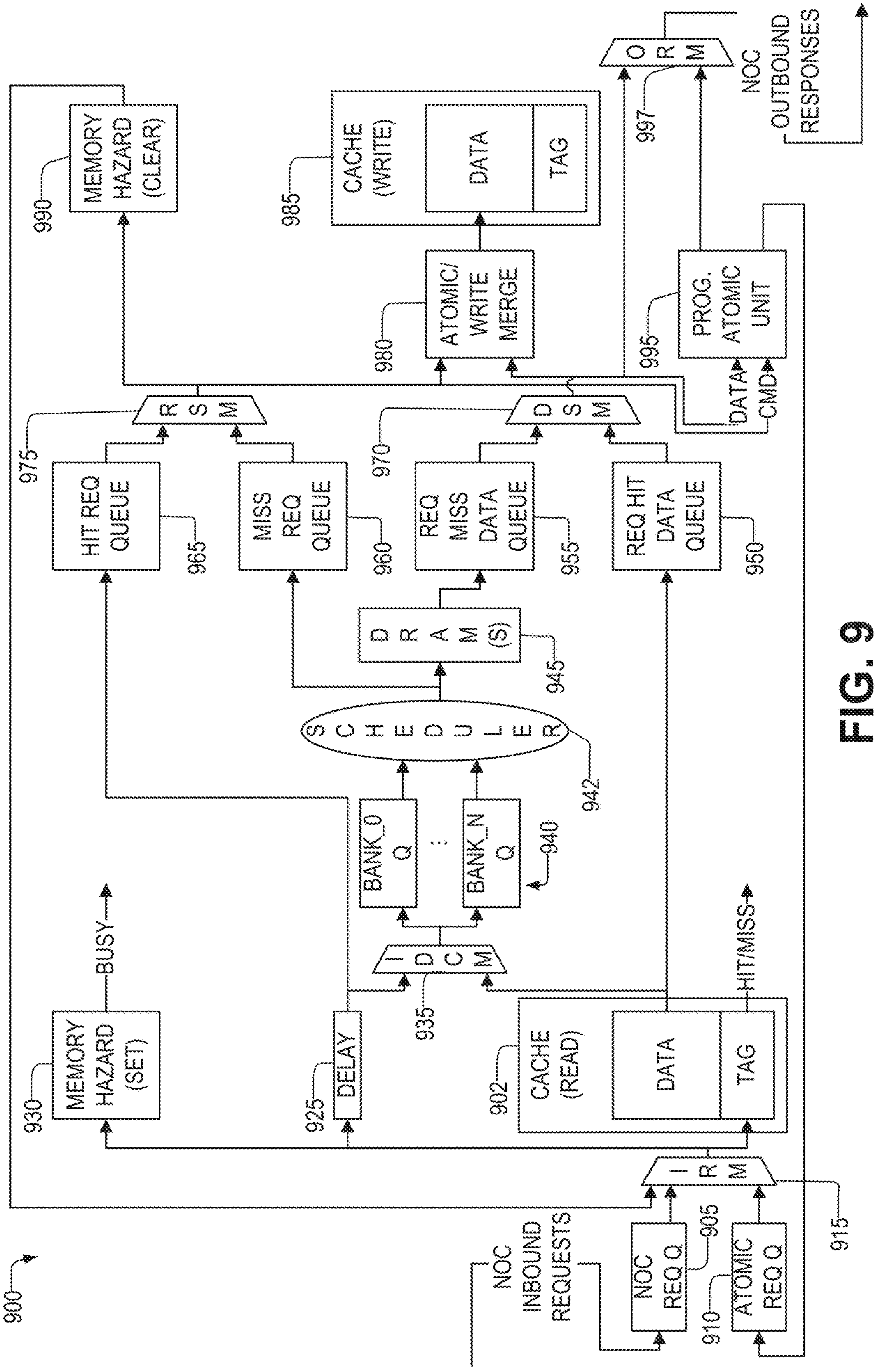
FIG. 9 illustrates a block diagram of a memory controller according to some examples of the present disclosure.

FIG. 9 illustrates a block diagram of a memory controller 900 according to some examples of the present disclosure. FIG. 9 is another example of a memory controller chiplet 205 and shows many of the same components as shown in FIG. 2. For example, the cache 902 and 985 are examples of cache 210; DRAM(s) 945 are examples of off-die memory 275-280; atomic/write merge 980 and the programmable atomic unit 995 may be an example of atomics and merge unit 250; other components of FIG. 9 may be examples of other components of FIG. 2 such as off-die memory controller 220 and cache controller 215. NOC Request Queue 905 receives requests from the network-on-chip and provides a small amount of queuing. Atomic Request Queue 910 receives requests from the programmable atomic unit and provides a small amount of queuing. Inbound Request Multiplexer (IRM) 915 selects between inbound memory request sources. The three sources, in order of priority are: Memory Hazard Requests, Atomic Requests, and Inbound NOC Requests. Cache (Read) 902 and Cache (Write) 985 is an SRAM data cache. The diagram shows the cache as two separate blocks (902 and 985), one providing read access, the other providing write access. Delay Block 925 provides one or more pipeline stages to mimic the delay for an SRAM cache read operation. A cache miss requires access to memory to bring the desired data into the cache. During this DRAM access time, the memory line is not available for other requests. The Memory Hazard block (Set block 930 and Clear block 990) maintains a table of hazard bits indicating which memory lines are unavailable for access. An inbound request that tries to access a line with a hazard is held by the Memory Hazard block until the hazard is cleared. Once the hazard is cleared then the request is resent through the Inbound Request Multiplexer. The memory line tag address is hashed to a hazard bit index. The number of hazard bits may be chosen to set the hazard collision probability to a sufficiently low level. Inbound DRAM Control Multiplexer (IDCM) 935 selects from an inbound NOC request and a cache eviction request. Bank Request Queues 940—each separately managed DRAM bank has a dedicated bank request queue to hold requests until they can be scheduled on the associated DRAM bank.

Scheduler 942 selects across the bank request queues 940 to choose a request for an available DRAM bank. The DRAM(s) block 945 represents the external DRAM device or devices. Request Hit Data Queue 950 holds request data from cache hits until selected. Request Miss Data Queue 955 holds data read from the DRAM(s) until selected. Miss Request Queue 960 is used to hold request packet information for cache misses until the request is selected. Hit Request Queue 965 holds request packet information for cache hits until selected. Data Selection Multiplexer (DSM) 970 selects between DRAM read data and cache hit read data. The selected data is written to the SRAM cache. Request Selection Multiplexer (RSM) 975 selects between hit and miss request queues 960 and 965.

Atomic/Write Merge 980 either merges the request data and DRAM read data, or, if the request is a built-in atomic, the memory data and request data are used as inputs for an atomic operation. Cache (Write) block 985 represents the write port for the SRAM cache. Data from a NOC write request and data from DRAM read operations are written to the SRAM cache. Memory Hazard (Clear) block 990 represents the hazard clear operation for the memory hazard structure. Clearing a hazard may release a pending NOC request and send it to the Inbound Request Multiplexer. Programmable Atomic Unit 995 processes programmable atomic transactions. NOC Outbound Response Multiplexer (ORM) 997 selects between memory controller responses and custom atomic unit responses and sends the selection to the NOC.

Figure 10:
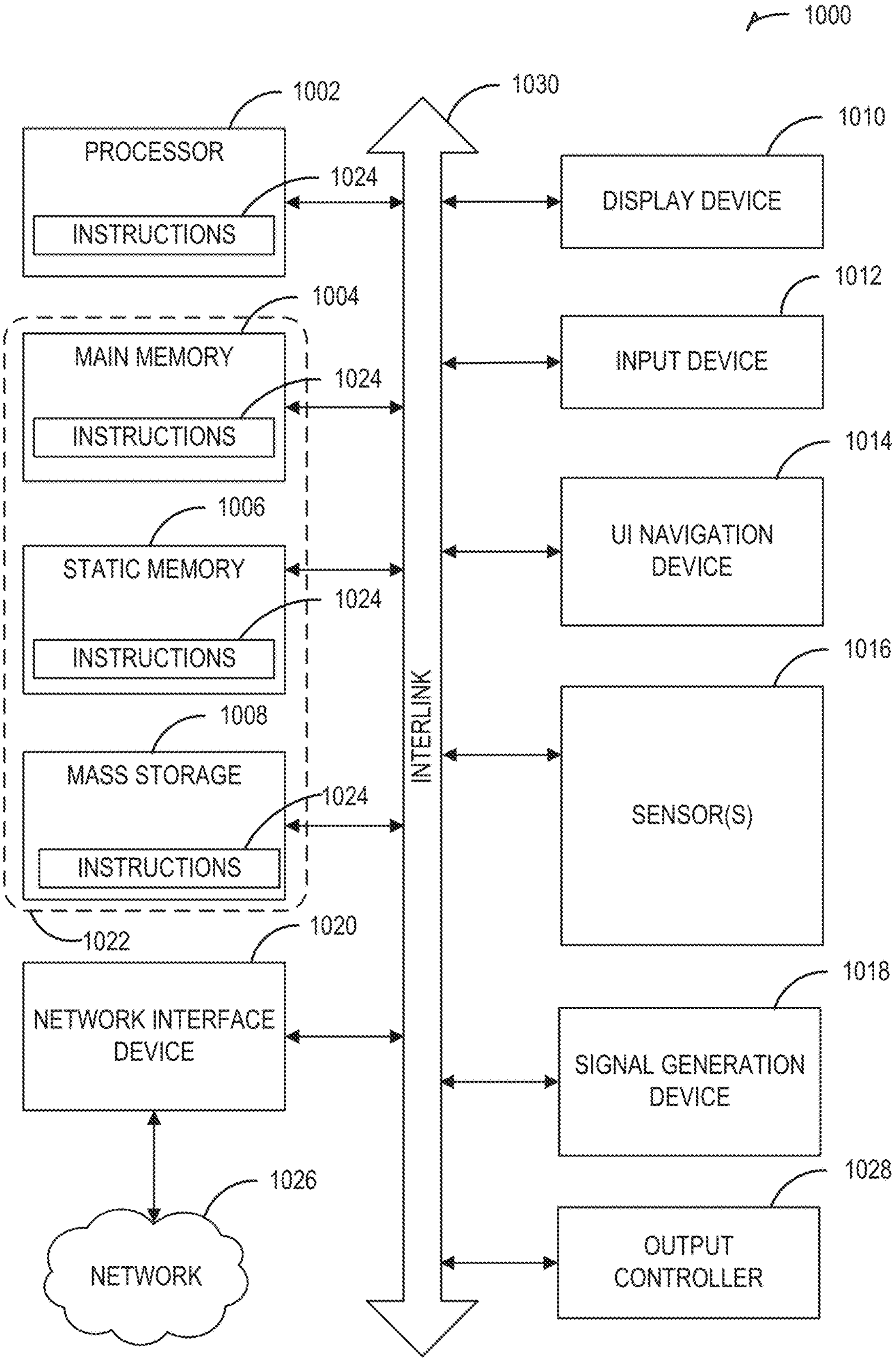
FIG. 10 is a block diagram of an example of a machine with which, in which, or by which embodiments of the present disclosure can operate according to some examples of the present disclosure.

FIG. 10 illustrates a block diagram of an example machine 1000 with which, in which, or by which any one or more of the techniques (e.g., methodologies) discussed herein can be implemented. Examples, as described herein, can include, or can operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 can operate as a standalone device or can be connected (e.g., networked) to other machines. In a networked deployment, the machine 1000 can operate in the capacity of a server machine, a client machine, or both in server-client network environments. In an example, the machine 1000 can act as a peer machine in peer-to-peer (P2P) (or other distributed) network environment. The machine 1000 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), other computer cluster configurations.

The machine (e.g., computer system) 1000 can include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drives, tape drives, flash storage, or other block devices) some or all of which can communicate with each other via an interlink (e.g., bus) 1030. The machine 1000 can further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 can be a touch screen display. The machine 1000 can additionally include a mass storage (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 can include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 can be, or include, a machine readable medium 1022 on which is stored one or more sets of data structures or instructions 1024 (e.g., software) embodying or utilized by any one or more of the techniques or functions described herein. The instructions 1024 can also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 can constitute the machine readable media 1022. While the machine readable medium

1022 is illustrated as a single medium, the term "machine readable medium" can include a single medium or multiple media (e.g., a centralized or distributed database, or associated caches and servers) configured to store the one or more instructions 1024.

The term "machine readable medium" can include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1022 can be representative of the instructions 1024, such as instructions 1024 themselves or a format from which the instructions 1024 can be derived. This format from which the instructions 1024 can be derived can include source code, encoded instructions (e.g., in compressed or encrypted form), packaged instructions (e.g., split into multiple packages), or the like. The information representative of the instructions 1024 in the machine readable medium 1022 can be processed by processing circuitry into the instructions to implement any of the operations discussed herein. For example, deriving the instructions 1024 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In an example, the derivation of the instructions 1024 can include assembly, compilation, or interpretation of the information (e.g., by the processing circuitry) to create the instructions 1024 from some intermediate or preprocessed format provided by the machine readable medium 1022. The information, when provided in multiple parts, can be combined, unpacked, and modified to create the instructions 1024. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1024 can be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 can include one or more physical jacks (e.g., Ethernet, coaxial, or phone jacks) or one or more antennas to connect to the communications network 1026. In an example, the network interface device 1020 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium. To better illustrate the methods and apparatuses described herein, a non-limiting set of Example embodiments are set forth below as numerically identified Examples.

OTHER NOTES AND EXAMPLES

Example 1 is a method comprising: determining a first identifier of a programmable atomic transaction, the first identifier uniquely identifying the programmable atomic transaction within a first process executing on a hardware processor of a multi-process system, a same first identifier in a second process referring to a different programmable atomic transaction; determining a second identifier based upon the first identifier and a mapping table, the second identifier uniquely identifying the programmable atomic transaction throughout the multi-process system; issuing a request to a memory controller of the multi-process system to perform the programmable atomic transaction, the request including a memory location of the programmable atomic transaction, the memory location based upon the second identifier; and receiving a response to the programmable atomic transaction.

In Example 2, the subject matter of Example 1 includes, wherein the request includes a memory address, the memory address storing a value, the programmable atomic transaction performed on the value.

In Example 3, the subject matter of Examples 1-2 includes, wherein the request is issued using a request packet and is sent over a communication network.

In Example 4, the subject matter of Example 3 includes, wherein the communication network is a chiplet communication network.

In Example 5, the subject matter of Examples 1~4 includes, registering the programmable atomic transaction, the registering including associating the first identifier with the second identifier and with the programmable atomic transaction.

In Example 6, the subject matter of Examples 1-5 includes, wherein the request further includes an argument for the programmable atomic transaction.

In Example 7, the subject matter of Examples 1-6 includes, determining that a second programmable atomic transaction is to be performed, the second programmable atomic transaction identified using the first identifier, the first identifier uniquely identifying the second programmable atomic transaction within the second process executing on the hardware processor of the multi-process system; determining a third identifier different than the second identifier, the third identifier based upon the first identifier and the mapping table, the third identifier uniquely identifying the programmable atomic transaction throughout the multi-process system; issuing a request to a memory controller to perform the second programmable atomic transaction, the request including a memory location of the second programmable atomic transaction; and receiving a response to the second programmable atomic transaction.

Example 8 is a device comprising: a hardware processor configured to: determine a first identifier of a programmable atomic transaction, the first identifier uniquely identifying the programmable atomic transaction within a first process executing on a multi-process system, a same first identifier in a second process referring to a different programmable atomic transaction; determine a second identifier based upon the first identifier and a mapping table, the second identifier uniquely identifying the programmable atomic transaction throughout the multi-process system; issue a request to a memory controller of the multi-process system to perform the programmable atomic transaction, the request including a memory location of the programmable atomic transaction, the memory location based upon the second identifier; and receive a response to the programmable atomic transaction.

In Example 9, the subject matter of Example 8 includes, wherein the request includes a memory address, the memory address storing a value, the programmable atomic transaction performed on the value.

In Example 10, the subject matter of Examples 8-9 includes, wherein the request is issued using a request packet and is sent over a communication network.

In Example 11, the subject matter of Example 10 includes, wherein the communication network is a chiplet communication network.

In Example 12, the subject matter of Examples 8-11 includes, wherein the hardware processor is further configured to register the programmable atomic transaction, including associating the first identifier with the second identifier and with the programmable atomic transaction.

In Example 13, the subject matter of Examples 8-12 includes, wherein the request further includes an argument for the programmable atomic transaction.

In Example 14, the subject matter of Examples 8-13 includes, wherein the hardware processor is further configured to: determine that a second programmable atomic transaction is to be performed, the second programmable atomic transaction identified using the first identifier, the first identifier uniquely identifying the second programmable atomic transaction within the second process executing on the hardware processor of the multi-process system; determine a third identifier different than the second identifier, the third identifier based upon the first identifier and the mapping table, the third identifier uniquely identifying the programmable atomic transaction throughout the multi-process system; issue a request to a memory controller to perform the second programmable atomic transaction, the request including a memory location of the second programmable atomic transaction; and receive a response to the second programmable atomic transaction.

Example 15 is a non-transitory machine-readable medium, the machine readable medium storing instructions, which when executed by a machine, cause the machine to perform operations comprising: determining a first identifier of a programmable atomic transaction, the first identifier uniquely identifying the programmable atomic transaction within a first process executing on a hardware processor of a multi-process system, a same first identifier in a second process referring to a different programmable atomic transaction; determining a second identifier based upon the first identifier and a mapping table, the second identifier uniquely identifying the programmable atomic transaction throughout the multi-process system; issuing a request to a memory controller of the multi-process system to perform the programmable atomic transaction, the request including a memory location of the programmable atomic transaction, the memory location based upon the second identifier; and receiving a response to the programmable atomic transaction.

In Example 16, the subject matter of Example 15 includes, wherein the request includes a memory address, the memory address storing a value, the programmable atomic transaction performed on the value.

In Example 17, the subject matter of Examples 15-16 includes, wherein the request is issued using a request packet and is sent over a communication network.

In Example 18, the subject matter of Example 17 includes, wherein the communication network is a chiplet communication network.

In Example 19, the subject matter of Examples 15-18 includes, wherein the operations further comprise registering the programmable atomic transaction, the registering including associating the first identifier with the second identifier and with the programmable atomic transaction.

In Example 20, the subject matter of Examples 15-19 includes, wherein the request further includes an argument for the programmable atomic transaction.

In Example 21, the subject matter of Examples 15-20 includes, wherein the operations further comprise: determining that a second programmable atomic transaction is to be performed, the second programmable atomic transaction identified using the first identifier, the first identifier uniquely identifying the second programmable atomic transaction within the second process executing on the hardware processor of the multi-process system; determining a third identifier different than the second identifier, the third identifier based upon the first identifier and the mapping table, the third identifier uniquely identifying the programmable atomic transaction throughout the multi-process system; issuing a request to a memory controller to perform the second programmable atomic transaction, the request including a memory location of the second programmable atomic transaction; and receiving a response to the second programmable atomic transaction.

Example 22 is a device comprising: means for determining a first identifier of the programmable atomic transaction, the first identifier uniquely identifying the programmable atomic transaction within a first process executing on a hardware processor of a multi-process system, a same first identifier in a second process referring to a different programmable atomic transaction; means for determining a second identifier based upon the first identifier and a mapping table, the second identifier uniquely identifying the programmable atomic transaction throughout the multi-process system; means for issuing a request to a memory controller of the multi-process system to perform the programmable atomic transaction, the request including a memory location of the programmable atomic transaction, the memory location based upon the second identifier; and means for receiving a response to the programmable atomic transaction.

In Example 23, the subject matter of Example 22 includes, wherein the request includes a memory address, the memory address storing a value, the programmable atomic transaction performed on the value.

In Example 24, the subject matter of Examples 22-23 includes, wherein the request is issued using a request packet and is sent over a communication network.

In Example 25, the subject matter of Example 24 includes, wherein the communication network is a chiplet communication network.

In Example 26, the subject matter of Examples 22-25 includes, means for registering the programmable atomic transaction, the means for registering including means for associating the first identifier with the second identifier and with the programmable atomic transaction.

In Example 27, the subject matter of Examples 22-26 includes, wherein the request further includes an argument for the programmable atomic transaction.

In Example 28, the subject matter of Examples 22-27 includes, means for determining that a second programmable atomic transaction is to be performed, the second programmable atomic transaction identified using the first identifier, the first identifier uniquely identifying the second programmable atomic transaction within the second process executing on the hardware processor of the multi-process system; means for determining a third identifier different than the second identifier, the third identifier based upon the first identifier and the mapping table, the third identifier uniquely identifying the programmable atomic transaction throughout the multi-process system; means for issuing a request to a memory controller to perform the second programmable atomic transaction, the request including a memory location of the second programmable atomic transaction; and means for receiving a response to the second programmable atomic transaction.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:

using a hardware processor:

receiving an instruction from a process to register a programmable atomic transaction, the instruction identifying a set of instructions for the programmable atomic transaction;

identifying a first identifier, the first identifier included in the instruction or assigned from a plurality of valid values;

locating one or more contiguous partitions in an instruction memory of a programmable atomic unit, a number of contiguous partitions determined based on the number of instructions in the programmable atomic transaction;

determining a second identifier based upon a location of a first one of the located one or more contiguous partitions;

loading the instructions into the instruction memory of the programmable atomic unit at the located one or more contiguous partitions;

populating a translation table with the determined first identifier and the second identifier, the first identifier uniquely identifying the programmable atomic transaction within the process and the second identifier uniquely identifying the programmable atomic transaction throughout a multi-process system;

providing a response indicating a successful registration of the programmable atomic transaction;

issuing a request to a memory controller of the multi-process system to perform the programmable atomic transaction, the request including a memory location of the programmable atomic transaction, the memory location based upon the second identifier; and
receiving a response to the programmable atomic transaction.

2. The method of claim 1, wherein the request to the memory controller to perform the programmable atomic transaction includes a memory address, the memory address storing a value that is used as an input to the programmable atomic transaction.

3. The method of claim 2, wherein the request is issued by sending a request packet over a packet-based communication network.

4. The method of claim 1, further comprising:
determining that a second programmable atomic transaction is to be performed, the second programmable atomic transaction identified using the first identifier, the first identifier uniquely identifying the second programmable atomic transaction within a second process executing on the hardware processor of the multi-process system;
determining a third identifier different than the second identifier, the third identifier based upon the first identifier and the translation table, the third identifier uniquely identifying the programmable atomic transaction throughout the multi-process system;
issuing a request to the memory controller to perform the second programmable atomic transaction, the request including a memory location of the second programmable atomic transaction; and
receiving a response to the second programmable atomic transaction.

5. The method of claim 1 wherein the translation table is stored in a hardware register.

6. The method of claim 1, wherein issuing the request to a memory controller of the multi-process system to perform the programmable atomic transaction is performed responsive to receiving a request from the process to execute the programmable atomic transaction.

7. The method of claim 6, wherein the request from the process to execute the programmable atomic transaction includes an argument for the programmable atomic transaction, and wherein issuing the request to a memory controller of the multi-process system to perform the programmable atomic transaction comprises providing the argument to the memory controller.

8. The method of claim 6, wherein the request from the process to execute the programmable atomic transaction includes an argument for the programmable atomic transaction, and wherein the operation of issuing the request to a memory controller of the multi-process system to perform the programmable atomic transaction comprises providing the argument to the memory controller.

9. A computing device comprising:
a hardware processor configured to perform operations comprising:
receiving an instruction from a process to register a programmable atomic transaction, the instruction identifying a set of instructions for the programmable atomic transaction;
identifying a first identifier, the first identifier included in the instruction or assigned from a plurality of valid values;
locating one or more contiguous partitions in an instruction memory of a programmable atomic unit, a number of contiguous partitions determined based on the number of instructions in the programmable atomic transaction;
determining a second identifier based upon a location of a first one of the located one or more contiguous partitions;
loading the instructions into the instruction memory of the programmable atomic unit at the located one or more contiguous partitions;
populating a translation table with the determined first identifier and the second identifier, the first identifier uniquely identifying the programmable atomic transaction within the process and the second identifier uniquely identifying the programmable atomic transaction throughout a multi-process system;
providing a response indicating a successful registration of the programmable atomic transaction;
issuing a request to a memory controller of the multi-process system to perform the programmable atomic transaction, the request including a memory location of the programmable atomic transaction, the memory location based upon the second identifier; and
receiving a response to the programmable atomic transaction.

10. The computing device of claim 9, wherein the request to the memory controller to perform the programmable atomic transaction includes a memory address, the memory address storing a value that is used as an input to the programmable atomic transaction.

11. The computing device of claim 10, wherein the request is issued by sending a request packet over a packet-based communication network.

12. The computing device of claim 9, wherein the operations further comprise:
determining that a second programmable atomic transaction is to be performed, the second programmable atomic transaction identified using the first identifier, the first identifier uniquely identifying the second programmable atomic transaction within a second process executing on the hardware processor of the multi-process system;
determining a third identifier different than the second identifier, the third identifier based upon the first identifier and the translation table, the third identifier uniquely identifying the programmable atomic transaction throughout the multi-process system;
issuing a request to the memory controller to perform the second programmable atomic transaction, the request including a memory location of the second programmable atomic transaction; and
receiving a response to the second programmable atomic transaction.

13. The computing device of claim 9 wherein the translation table is stored in a hardware register.

14. The computing device of claim 9, wherein the operation of issuing the request to a memory controller of the multi-process system to perform the programmable atomic transaction is performed responsive to receiving a request from the process to execute the programmable atomic transaction.

15. A non-transitory machine-readable medium, storing instructions, which when executed by a machine, causes the machine to perform operations comprising:
receiving an instruction from a process to register a programmable atomic transaction, the instruction identifying a set of instructions for the programmable atomic transaction;
identifying a first identifier, the first identifier included in the instruction or assigned from a plurality of valid values;

locating one or more contiguous partitions in an instruction memory of a programmable atomic unit, a number of contiguous partitions determined based on the number of instructions in the programmable atomic transaction;

determining a second identifier based upon a location of a first one of the located one or more contiguous partitions;

loading the instructions into the instruction memory of the programmable atomic unit at the located one or more contiguous partitions;

populating a translation table with the determined first identifier and the second identifier, the first identifier uniquely identifying the programmable atomic transaction within the process and the second identifier uniquely identifying the programmable atomic transaction throughout a multi-process system;

providing a response indicating a successful registration of the programmable atomic transaction;

issuing a request to a memory controller of the multi-process system to perform the programmable atomic transaction, the request including a memory location of the programmable atomic transaction, the memory location based upon the second identifier; and receiving a response to the programmable atomic transaction.

16. The non-transitory machine-readable medium of claim 15, wherein the request to the memory controller to perform the programmable atomic transaction includes a memory address, the memory address storing a value that is used as an input to the programmable atomic transaction.

17. The non-transitory machine-readable medium of claim 16, wherein the request is issued by sending a request packet over a packet-based communication network.

18. The non-transitory machine-readable medium of claim 15, wherein the operations further comprise:

determining that a second programmable atomic transaction is to be performed, the second programmable atomic transaction identified using the first identifier, the first identifier uniquely identifying the second programmable atomic transaction within a second process executing on a hardware processor of the multi-process system;

determining a third identifier different than the second identifier, the third identifier based upon the first identifier and the translation table, the third identifier uniquely identifying the programmable atomic transaction throughout the multi-process system;

issuing a request to the memory controller to perform the second programmable atomic transaction, the request including a memory location of the second programmable atomic transaction; and receiving a response to the second programmable atomic transaction.

19. The non-transitory machine-readable medium of claim 15 wherein the translation table is stored in a hardware register.

20. The non-transitory machine-readable medium of claim 15, wherein the operation of issuing the request to a memory controller of the multi-process system to perform the programmable atomic transaction is performed responsive to receiving a request from the process to execute the programmable atomic transaction.

* * * * *